(12) United States Patent
Aupperle

(10) Patent No.: US 10,086,512 B2
(45) Date of Patent: Oct. 2, 2018

(54) PROTECTION APPARATUS FOR A MANIPULATION DEVICE ON A HANDLING DEVICE, AS WELL AS HANDLING DEVICE

(71) Applicant: Robert Bosch GmbH, Stuttgart (DE)

(72) Inventor: Bernd Aupperle, Kernen Im Remstal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 38 days.

(21) Appl. No.: 15/374,160

(22) Filed: Dec. 9, 2016

(65) Prior Publication Data

US 2017/0173785 A1 Jun. 22, 2017

(30) Foreign Application Priority Data

Dec. 21, 2015 (DE) .................... 10 2015 226 205

(51) Int. Cl.
    *G05B 19/18*     (2006.01)
    *B25J 9/10*     (2006.01)
    *B25J 19/06*     (2006.01)

(52) U.S. Cl.
    CPC ............... *B25J 9/101* (2013.01); *B25J 19/06* (2013.01); *B25J 19/063* (2013.01)

(58) Field of Classification Search
None
See application file for complete search history.

(56) References Cited

FOREIGN PATENT DOCUMENTS

DE      20314896 U1    10/2004
WO    2009080373 A1    7/2009

*Primary Examiner* — Bhavesh V Amin
(74) *Attorney, Agent, or Firm* — Norton Rose Fulbright US LLP; Gerard Messina

(57) ABSTRACT

A protection apparatus for a manipulation device on a handling device, in particular on a handling robot. The manipulation device has at least one movably developed manipulation element and at least one overload protection which induces an evasion of the manipulation device when a trigger force on the manipulation device is exceeded. The overload protection has at least one magnetic element, which fixates the manipulation device in a setpoint position at forces below the trigger force.

16 Claims, 3 Drawing Sheets

PROTECTION APPARATUS FOR A MANIPULATION DEVICE ON A HANDLING DEVICE, AS WELL AS HANDLING DEVICE

CROSS REFERENCE

The present application claims the benefit under 35 U.S.C. § 119 of German Patent Application No. DE 102015226205.7 filed on Dec. 21, 2015, which is expressly incorporated herein by reference in its entirety.

FIELD

The present invention relates to a protection apparatus for a manipulation device on a handling device, in particular on a handling robot. Furthermore, the present invention relates to a handling device having a protection apparatus according to the present invention.

BACKGROUND INFORMATION

A protection apparatus is described in German Patent Application No. DE 203 14 896 U1. In the conventional protection apparatus, a frame assembled from pipes is mounted on a gripper arm of the handling device, the frame being connected to gripping or clamping elements for grasping workpieces or similar items. In this context, it is provided that when an overload occurs, so-called deflection safety devices are utilized for an evasion of the gripping or clamping elements through an evasive motion of the pipes. The deflection safety devices are developed as frictionally acting catch elements, in particular in the form of spring-loaded locking balls. It is essential in this context that when a load occurs that lies below the overload, the locking balls are pushed out of their seat counter to the spring force, and out of their guides by a lifting motion. During this push-out process, the pipes, and thus also the gripping or clamping elements, are movable by a certain angular amount or by a certain distance, yet exert relatively strong resistance to the load. Only when the load is so great that the balls fully project from their guides, does a large-scale evasion of the manipulation device take place. However, such limited evading of the manipulation device is not desired in the presence of forces that lie below the overload.

SUMMARY

An object of the present invention is to provide a protection apparatus for a manipulation device on a handling device in such a way that if a trigger force is exceeded, an essentially immediate evasion of the manipulation is able to take place.

In accordance with the present invention, the overload protection includes at least one magnetic element that fixates the manipulation device in a setpoint position at forces below the trigger force. In said setpoint position, the manipulation device is thus at least essentially in a rigid position, so that an especially satisfactory guidance or precision of the movement of the manipulation device is able to be achieved in case of forces that are below the overload or the trigger force. As soon as the trigger force is exceeded on the manipulation device, the magnetic force of the magnetic element of the overload protection is abruptly overcome and allows for an evasion of the manipulation device by a relatively large amount of travel. Detecting the overcoming of the magnetic force of the magnetic element is dependent solely on the responsiveness of the sensor device which senses the movement of the element that is at least indirectly connected to the magnetic element.

Advantageous further refinements of the protection apparatus according to the present invention are described herein.

In order to allow for an especially uncomplicated guided return of the manipulation device to its original position in which an operation of the manipulation device is possible again once the trigger force that activates the protection apparatus has ceased, the overload safety includes a spring which acts on the overload safety counter to the direction of the trigger force. In addition, the spring such as this also make it possible to set or adapt the adjusting force required for moving the manipulation device or for an evasion of the manipulation device in a very simple and precise manner, for instance also after triggering of the protection apparatus.

In one implementation of the present invention, which is preferred from the aspect of construction, the overload protection is situated between a housing-mounted component and a movably disposed component of the handling device, and the movably disposed component carries the manipulation device.

In order to achieve an evasion possibility of the manipulation device even without an exceeding of the trigger force, it is proposed that the manipulation device be situated in a guide of the movably disposed component in a linearly displaceable manner. As long as the manipulation device in the guide is moved in a direction other than the direction of the trigger force, the protection apparatus is then also unable to respond.

To position the manipulation device within the guide in a setpoint position, it is provided that the manipulation device in the guide is acted upon by a force against a stop through the force of gravity.

In another further refinement of the present invention, the movably disposed component is aligned with respect to the housing-mounted component with the aid of a plurality of guide elements, and is supported via the guide elements so as to allow pivoting about at least one space axis, and preferably about three space axes that are situated perpendicularly with respect to one another. Such guide elements, for example, may be developed in the form of ball pins, which interact with mating elements and allow centering of the movably developed or disposed component in relation to the housing-mounted component as long as the ball pins are still situated in the area of the guides.

In order to allow for a force application of the guide elements with respect to the fixedly disposed component on the one hand, and to allow for the same adjustment travel of the manipulation device for all three space axes on the other, the spring element is provided in the form of a cylindrical spring, which is situated in a centered manner with respect to the plurality of guide elements, and the longitudinal axis of the cylindrical spring is aligned with the direction of the trigger force.

In the event of a deflection of the manipulation device in relation to the at least one space axis, and preferably, to the three space axes, by an angle that leads to a potential endangerment of objects or persons, it is provided that at least one sensor device is present, which is coupled with a control device of the handling device and which transfers the handling device into a safe operating mode when the angle of the movably disposed component is exceeded. A safe operating mode means the stopping of the operation of the manipulation device, in particular.

In addition, the device also includes a handling device, in particular a handling robot, provided with a protection apparatus as described thus far. The handling device has the same advantages as have been described within the scope of the protection apparatus.

Further advantages, features and details of the present invention result from the following description of preferred exemplary embodiments and from the figures.

BRIEF DESCRIPTION OF THE DRAWINGS

Identical elements or elements having the identical function have been provided with identical reference numerals in the figures.

DETAILED DESCRIPTION OF EXAMPLE EMBODIMENTS

Figure 1:
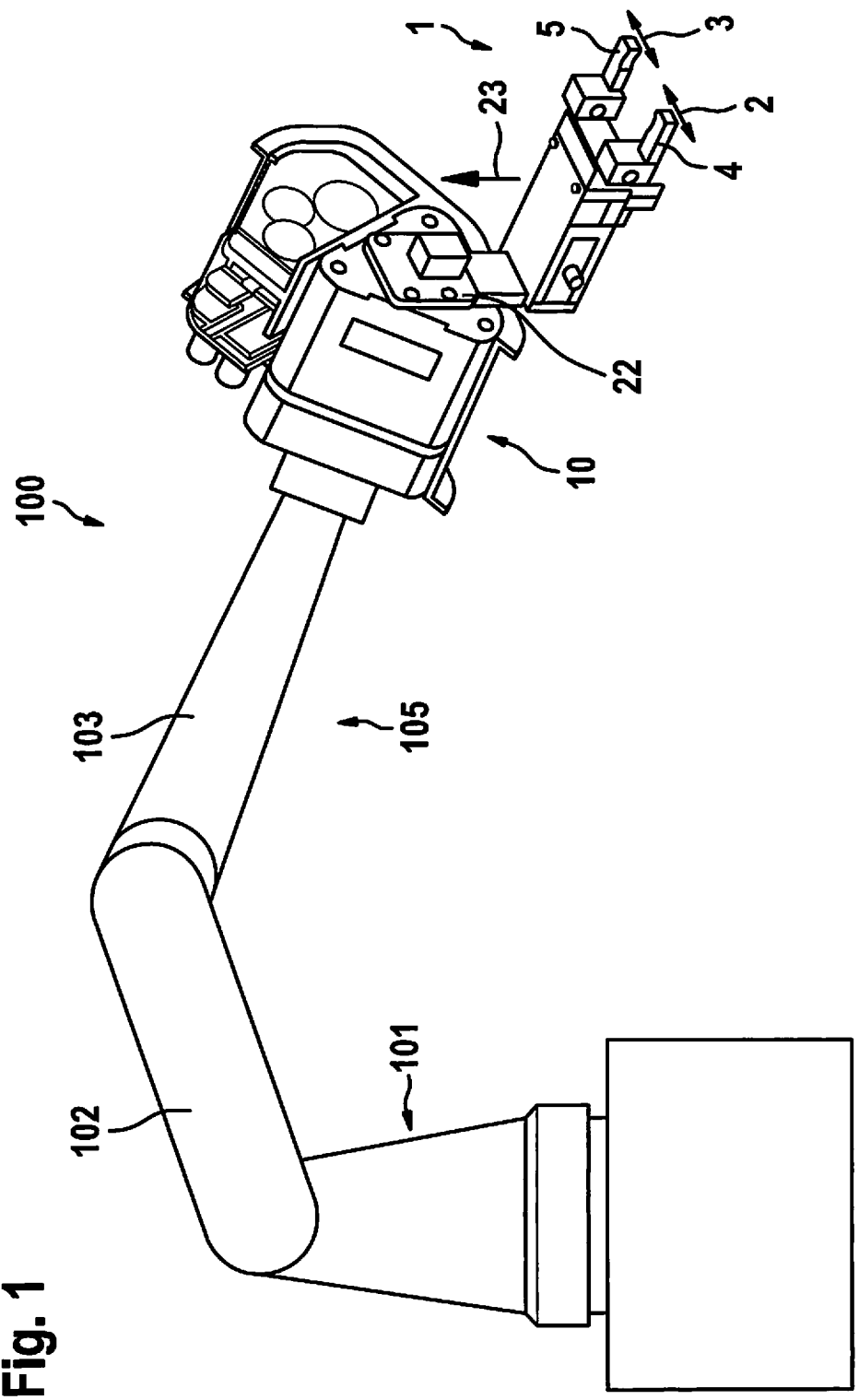
FIG. 1 shows a greatly simplified representation of a handling device in the form of a handling robot having a protection apparatus according to the present invention, in a perspective representation.

FIG. 1 shows a handling device 100 in the form of a handling robot in a greatly simplified manner. Handling device 100 has a stationary column 101 on which a robot arm 105 is situated; robot arm 105 is made up of a plurality of members 102, 103 which are situated so as to allow pivoting about a respective axis in relation to each other. Robot arm 105 is positioned such that it is able to move freely within the range of handling device 100, or it is designed to be movable between different positions in space. On its side facing away from column 101, robot arm 105 carries a manipulation device 1 having two gripping elements 4, 5, which are situated so as to allow them to move in the direction of double arrows 2, 3, for example. For instance, an object is able to be picked up or accepted at a first position and to be set down or handed over at a second position with the aid of gripping elements 4, 5. Handling device 100 described thus far is used for the automated production of machinery or components, in particular.

In the area of robot arm 105, handling device 100 has a protection apparatus 10 in the transition area to manipulation device 1, which is integrated into robot arm 105 by way of example and includes an overload protection for manipulation device 1. As is clear from an overall view of FIGS. 2 and 3 in particular, protection apparatus 10 includes two housing-mounted components 11, 12, between which a component 13 is situated so that it can move relative to components 11, 12. As is clear especially from FIG. 3, component 13 is developed in the form of a triangular plate; on the side pointing toward housing-mounted component 11, component 13 is designed to be movable from the position shown in FIG. 2 in the direction of arrow 16 toward housing-mounted component 11, this being accomplished with the aid of a spring element 14 developed in the form of a compression spring 15, and component 13 being acted upon by a force in the direction of component 12.

On the side facing housing-mounted component 12, ball pins 18, such as three by way of example, are fixed in place on component 13, each mounted via a respective cylindrical intermediate piece 17 in each case. Ball pins 18 engage in recesses 19 in housing-mounted component 12, which are developed in the form of blind holes or as through holes, for example. Because of the spring force of compression spring 15, a force is applied to component 13 in the direction of housing-mounted component 12, so that ball pins 18 engage in recesses 19.

Figure 2:
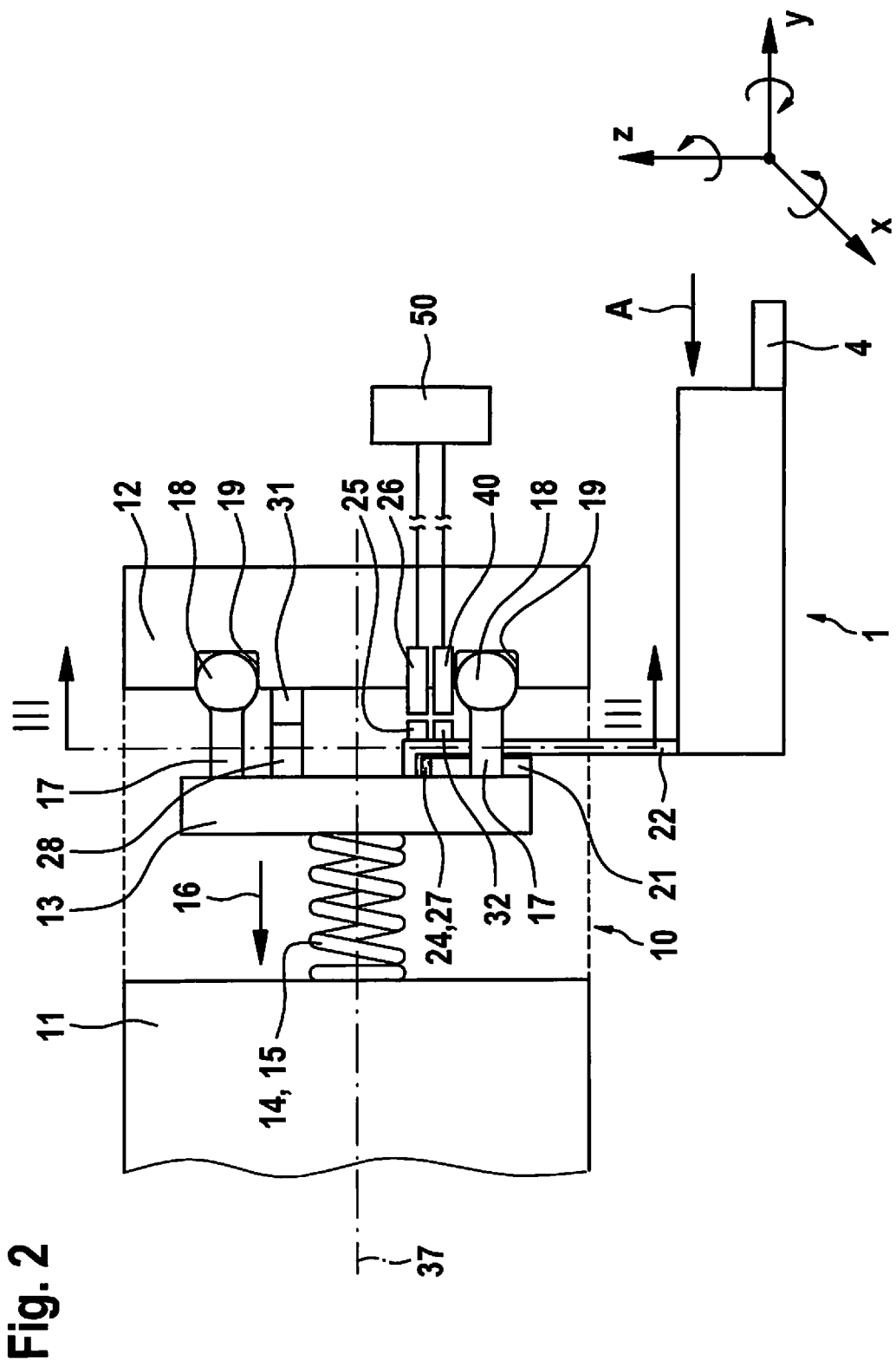
FIG. 2 shows a schematic representation of the protection apparatus as it is used in the handling device according to FIG. 1.
Figure 3:
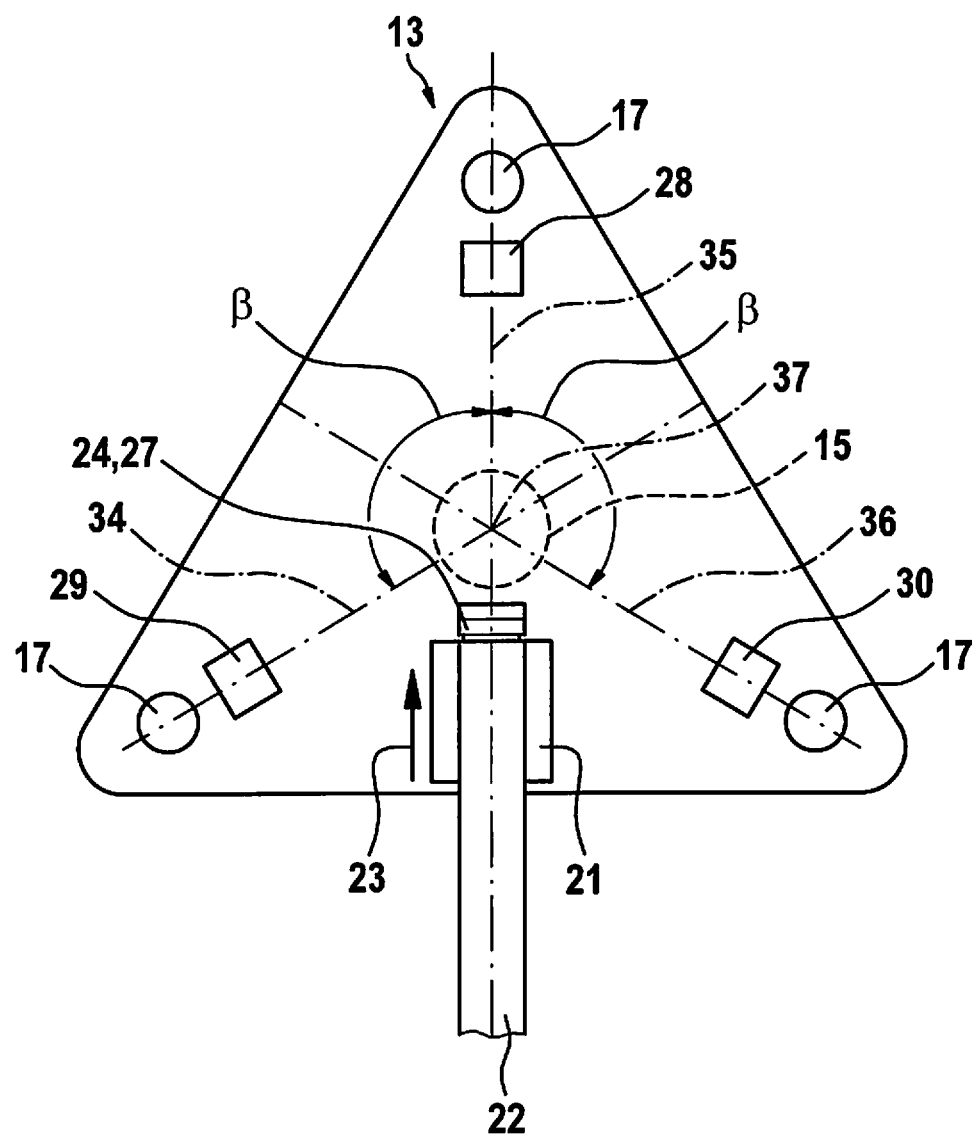
FIG. 3 shows a section in the plane III-III of FIG. 2.

A guide element 21 is situated on component 13 between the two components 12 and 13, by which a fastening plate 22, visible in FIG. 1, via which manipulation device 1 is fastened to protection apparatus 10 or to robot arm 105, is able to be moved in the direction of arrow 23, from the position shown in FIGS. 1 and 2 into a raised position. In this context it is essential that because of the weight force of manipulation device 1, it, or fastening plate 22, rests against a housing-mounted stop 24, so that manipulation device 1 is situated in a way that allows it to move counter to the force of gravity or the weight force of manipulation device 1. To increase the possible accelerations of fastening plate 22 or manipulation device 1 without the protection apparatus responding, it is provided that in addition to stop 24, a magnetic element 27 is provided which cooperates with fastening plate 22 and generates an additional force in the direction of the weight force of fastening plate 22.

If forces are acting on manipulation device 1 about the three space axes x, y and z, shown in FIG. 2 and situated perpendicularly with respect to one another, then it is possible that because of the guidance of component 13 via ball pins 18 in recesses 24 of component 12, component 13, and thus also manipulation device 1, is pivotable about a specific angle in space axes x, y and z.

Fastening plate 22 has two damping elements 25, 32 as part of a proximity switch 26, 40; these damping elements are situated on a section between the two components 12, 13 that projects from guide element 21. The two redundantly acting proximity switches 26, 40 are connected to, or coupled with, a control device 50 of handling device 100. The function of the two proximity switches 26 and 40 is such that when component 13 is pivoted about one of the three space axes x, y and z, or when fastening plate 22 is lifted counter to the force of gravity, a corresponding signal is forwarded to control device 50, whereupon handling device 100 transitions to a safe operation. The safe operation preferably consists of stopping of the movements of handling device 100.

Furthermore, protection apparatus 10 has as part of the overload protection a plurality of magnetic elements 28, 29 and 30, i.e. three in the exemplary embodiment, which are fixed in place on component 13, the magnetic elements cooperating with a respective cylindrical extension 31 on component 12 and fixating component 13 with respect to element 12 in an (axial) setpoint position. As can be seen especially from FIG. 3, both the three intermediate pieces 17 or pin bolts 18 and the three magnetic elements 28 through 30 are situated at an offset from each other at a respective angle β of 120° in relation to the respective bisectrix 34 through 36 of component 13. Furthermore, it can be seen from FIG. 3 that longitudinal axis 37 of compression spring 15 crosses the point of intersection of bisectrix 34 through 36 in an approximately centered manner.

When a trigger force A arises that is acting on manipulation device 1 or movably situated component 13 in parallel with the direction of longitudinal axis 37 of compression spring 15, and trigger force A is greater than the forces acting between magnetic elements 28 through 30 and extensions 31, then the magnetic connection between magnetic elements 28 through 30 and extensions 31 is canceled. This is also detected by proximity switches 26, 40, so that handling device 100 is switched into the aforementioned safe operating mode.

Handling device 100 or protection apparatus 10 described herein may be modified in a variety of ways without deviating from the present invention.

What is claimed is:

1. A protection apparatus for a manipulation device on a handling device, the handling device being a handling robot, the manipulation device having at least one moveable manipulation element, the protection apparatus comprising:
   at least one overload protection which causes an evasion of the manipulation device when a trigger force on the manipulation device is exceeded, the overload protection including:
     at least one magnetic element which fixes the manipulation device in a setpoint position at forces below the trigger force, and
     at least one sensor device coupled to a control device of the handling device, the sensor to detect when a force on the manipulation device exceeds the trigger force and to forward a corresponding signal to the control device when the force on the manipulation device exceeds the trigger force, the control device transitioning the handling device to a safe operation based on the corresponding signal.

2. The protection apparatus as recited in claim 1, wherein the overload protection includes a spring which applies a force to the at least one magnetic element in a direction counter to the trigger force.

3. The protection apparatus as recited in claim 1, wherein the overload protection is situated between a housing-mounted component and a movably disposed component of the handling device, and the movably disposed component carries the manipulation device.

4. The protection apparatus as recited in claim 3, wherein the manipulation device is situated in a guide of the movably disposed component in a manner that allows a linear displacement.

5. The protection apparatus as recited in claim 4, wherein through the force of gravity, the manipulation device in the guide is acted upon by a force against a stop through the force of gravity.

6. The protection apparatus as recited in claim 3, wherein the movably disposed component is aligned with the aid of a plurality of guide elements with respect to a housing-mounted component and is supported via the guide elements so as to allow pivoting about at least one space axis.

7. The protection apparatus as recited in claim 3, wherein the movably disposed component is aligned with the aid of a plurality of guide elements with respect to a housing-mounted component and is supported via the guide elements so as to allow pivoting about three space axes that are situated perpendicularly with respect to one another.

8. The protection apparatus as recited in claim 6, wherein a spring in the form of a cylindrical spring is provided, which is situated in a centered manner with respect to the plurality of guide elements, and the longitudinal axis of the cylindrical spring is aligned with the direction of the trigger force.

9. A protection apparatus for a manipulation device on a handling device, the handling device being a handling robot, the manipulation device having at least one moveable manipulation element, the protection apparatus comprising:
   at least one overload protection which causes an evasion of the manipulation device when a trigger force on the manipulation device is exceeded, the overload protection including:
     at least one magnetic element which fixes the manipulation device in a setpoint position at forces below the trigger force;
   wherein the overload protection is situated between a housing-mounted component and a movably disposed component of the handling device, and the movably disposed component carries the manipulation device;
   wherein the movably disposed component is aligned with the aid of a plurality of guide elements with respect to a housing-mounted component and is supported via the guide elements so as to allow pivoting about at least one space axis;
   wherein at least one sensor device coupled with a control device of the handling device is provided, which transfers the handling device into a safe operating mode if a specific angle of the movably disposed component is exceeded or a linear movement of the manipulation device counter to its weight force occurs.

10. A handling robot, comprising:
    a manipulation device having at least one moveable manipulation element; and
    a protective apparatus including at least one overload protection which causes an evasion of the manipulation device when a trigger force on the manipulation device is exceeded, the overload protection including:
      at least one magnetic element which fixes the manipulation device in a setpoint position at forces below the trigger force, and
      at least one sensor device coupled to a control device of the handling device, the sensor to detect when a force on the manipulation device exceeds the trigger force and to forward a corresponding signal to the control device when the force on the manipulation device exceeds the trigger force, the control device transitioning the handling device to a safe operation based on the corresponding signal.

11. The protection apparatus as recited in claim 1, wherein the at least one magnetic element magnetically fixes the manipulation device in the setpoint point position at forces below the trigger force, and wherein the protective device further comprises:
    a moveable plate on which the at least one magnetic element is mounted; and
    a fastening plate via which the manipulation device is fastened to the moveable plate;
    wherein the at least one sensor device detects the force on the manipulation device exceeding the trigger force when a magnetic force of a magnetic connection of the at least one magnetic element is exceeded by the force on the manipulation device.

12. The protection apparatus as recited in claim 11, wherein the moveable plate is pivotable about three axes that are perpendicular relative to one another, and wherein the movable plate pivots about one of the axes when the magnetic force is exceeded.

13. The protective apparatus as recited in claim 12, wherein the at least one sensor device detects the force on the manipulation device exceeding the trigger force based on a pivoting of the moveable plate about the one of the axes.

14. The protective apparatus as recited in claim 13, wherein the at least one sensor device includes at least one proximity switch.

15. The protection apparatus as recited in claim 11, wherein the at least one sensor device detects the force on the manipulation device exceeding the trigger force when the fastening plate is lifted counter to a force of gravity.

16. The protection apparatus as recited in claim 3, wherein the at least one sensor device forwards the corresponding signal to the control device when a specific angle of the movably disposed component is exceeded or a linear movement of the manipulation device counter to its weight force occurs.

* * * * *